(12) United States Patent
Li

(10) Patent No.: US 12,446,029 B2
(45) Date of Patent: Oct. 14, 2025

(54) METHOD FOR RESOURCE REQUEST INFORMATION PROCESSING, APPARATUS, COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 399 days.

(21) Appl. No.: 18/003,107

(22) PCT Filed: Jul. 23, 2020

(86) PCT No.: PCT/CN2020/103862
§ 371 (c)(1),
(2) Date: Dec. 22, 2022

(87) PCT Pub. No.: WO2022/016466
PCT Pub. Date: Jan. 27, 2022

(65) Prior Publication Data
US 2023/0254847 A1    Aug. 10, 2023

(51) Int. Cl.
*H04W 72/1268* (2023.01)
*H04W 72/231* (2023.01)

(52) U.S. Cl.
CPC ..... *H04W 72/1268* (2013.01); *H04W 72/231* (2023.01)

(58) Field of Classification Search
None
See application file for complete search history.

(56) References Cited

U.S. PATENT DOCUMENTS

| | | | |
|---|---|---|---|
| 9,535,751 B2 * | 1/2017 | Stelmar Netto | .... H04L 41/0883 |
| 2005/0071298 A1 | 3/2005 | Forman et al. | |
| 2015/0163157 A1 * | 6/2015 | Hao | ....... G06F 9/5072 709/226 |
| 2017/0109815 A1 * | 4/2017 | Bai | .......... G06Q 30/08 |
| 2017/0171837 A1 * | 6/2017 | Chen | ...... H04W 72/20 |
| 2017/0324810 A1 * | 11/2017 | Billore | ........ H04L 67/10 |
| 2018/0191822 A1 * | 7/2018 | Kairali | ...... H04L 67/02 |
| 2019/0230654 A1 * | 7/2019 | Luo | ......... H04W 72/21 |
| 2020/0319907 A1 * | 10/2020 | Jain | ......... G06F 9/5072 |
| 2021/0157644 A1 * | 5/2021 | Unnikrishnan | ....... G06F 9/5072 |

FOREIGN PATENT DOCUMENTS

| | | |
|---|---|---|
| CN | 104507172 A | 4/2015 |
| CN | 109769207 A | 5/2019 |
| CN | 110418418 A | 11/2019 |
| CN | 110532092 A | 12/2019 |
| CN | 110851529 A | 2/2020 |
| CN | 110996390 A | 4/2020 |
| CN | 111240836 A | 6/2020 |
| CN | 111294860 A | 6/2020 |
| CN | 111869303 A | 10/2020 |

* cited by examiner

*Primary Examiner* — Clemence S Han
(74) *Attorney, Agent, or Firm* — McCoy Russell LLP

(57) ABSTRACT

A resource request information processing method includes: reporting computation resource request information, where the computation resource request information is configured for requesting computation resource from a network side.

16 Claims, 4 Drawing Sheets

| Base station | | Terminal |
|---|---|---|

S110: report computation resource request information, where the computation resource request information is used for requesting a computation resource from a network side

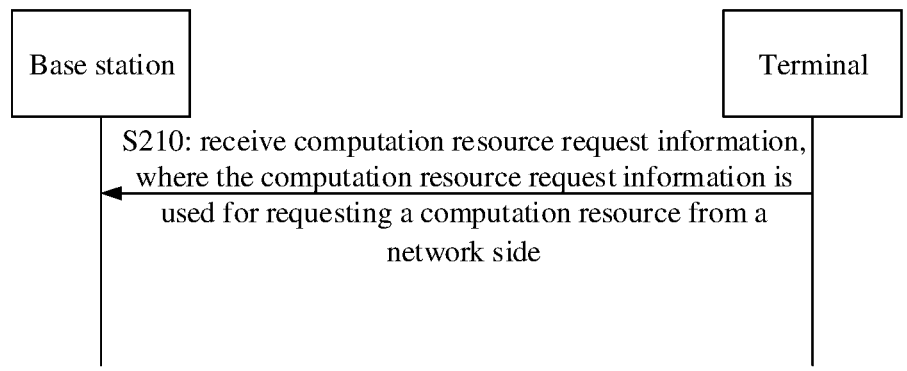
Fig. 4
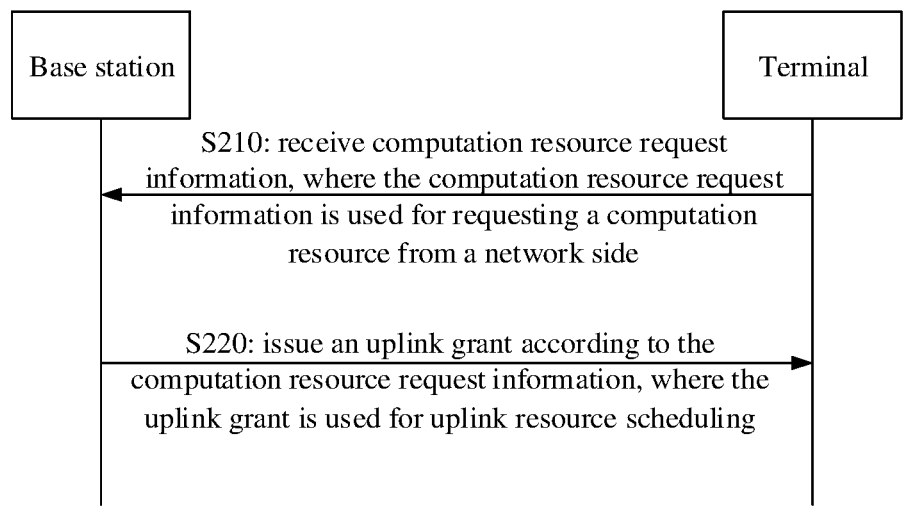
Fig. 5
Fig. 6

METHOD FOR RESOURCE REQUEST INFORMATION PROCESSING, APPARATUS, COMMUNICATION DEVICE AND STORAGE MEDIUM

CROSS REFERENCE TO RELATED APPLICATIONS

The present application is a U.S. National Phase of International Application No. PCT/CN2020/103862 entitled "RESOURCE REQUEST INFORMATION PROCESSING METHOD AND APPARATUS, AND COMMUNICATION DEVICE AND STORAGE MEDIUM," and filed on Jul. 23, 2020. The entire contents of each of the above-listed applications are hereby incorporated by reference for all purposes.

BACKGROUND

An uplink grant is generally used at the network side (for example, base station) to schedule uplink transmission of a user equipment (UE).

The uplink transmission needs to occupy various resources, for example, typical resources occupied by the uplink transmission are air interface resources of uplink channels.

SUMMARY

Provided in examples of the disclosure are a method and apparatus for processing resource request information, a communication device, and a storage medium.

According to a first aspect of the disclosure, a method for processing resource request information is provided, and the method includes:
  reporting computation resource request information, where the computation resource request information is used for requesting a computation resource from a network side.

According to a second aspect of the disclosure, a method for processing resource request information is provided, and the method includes:
  receiving computation resource request information, where the computation resource request information is used for requesting a computation resource from a network side.

According to a third aspect of the disclosure, a communication device is provided. The communication device includes a processor, a transceiver, a memory, and an executable program stored on the memory and executable by the processor. When running the executable program, the processor executes the method shown according to any one of technical solutions of the first aspect or the second aspect.

According to a fourth aspect of the disclosure, a non-transitory computer storage medium is provided. The non-transitory computer storage medium stores an executable program, and the executable program may implement the method shown according to any one of technical solutions of the first aspect or the second aspect after being executed by a processor.

It is to be understood that both the foregoing general description and the following detailed description are illustrative and explanatory merely and are not restrictive of examples of the disclosure.

BRIEF DESCRIPTION OF THE DRAWINGS

The accompanying drawings here are incorporated into the description as a constituent part of the description, illustrate examples conforming to the disclosure, and serve to explain principles of the examples of the disclosure along with the description.

FIG. 4 is a schematic flow diagram of a BSR according to an example;

FIG. 5 is a schematic diagram of a method for processing resource request information according to an example;

FIG. 6 is a schematic flow diagram of a method for processing resource request information according to an example;

DETAILED DESCRIPTION

Description will here be made in detail to examples, instances of which are illustrated in the accompanying drawings. When the following description refers to the accompanying drawings, the same numbers in different accompanying drawings refer to the same or similar elements unless otherwise instructed. The implementations described in the following examples do not denote all implementations consistent with the examples of the disclosure. On the contrary, the embodiments are merely instances of an apparatus and a method consistent with some aspects of the examples of the disclosure as detailed in the appended claims.

The terms used in the examples of the disclosure are merely for the purpose of describing specific examples, and are not intended to limit the examples of the disclosure. The singular forms such as "a/an", "said" and "the" used in the examples of the disclosure and the appended claims are also intended to include the plural forms, unless otherwise clearly stated in the context. It should also be understood that the term "and/or" used here refers to and contains any or all possible combinations of one or more associated listed items.

It should be understood that although the terms "first", "second", "third", etc. can be employed in the examples of the disclosure to describe various information, such information should not be limited to these terms. These terms are merely used for distinguishing the same type of information from each other. For instance, first information may also be referred to as second information, and similarly, second information may also be referred to as first information, without departing from the scope of the examples of the disclosure. The word "if" as used here may be construed to mean "upon" or "when" or "in response to determining", depending on the context.

As technology advances, the uplink transmission may consume not only the air interface resources but also other resources.

During logic channel multiplexing, how to ensure that a transport channel is multiplexed or a service corresponding to a logic channel can be well carried on a resource corresponding to the transport channel is a problem that needs to be addressed further in the related art.

The disclosure relates to, but not limited to, the technical field of radio communication, and in particular to a method and apparatus for processing resource request information, a communication device, and a storage medium.

Figure 1:
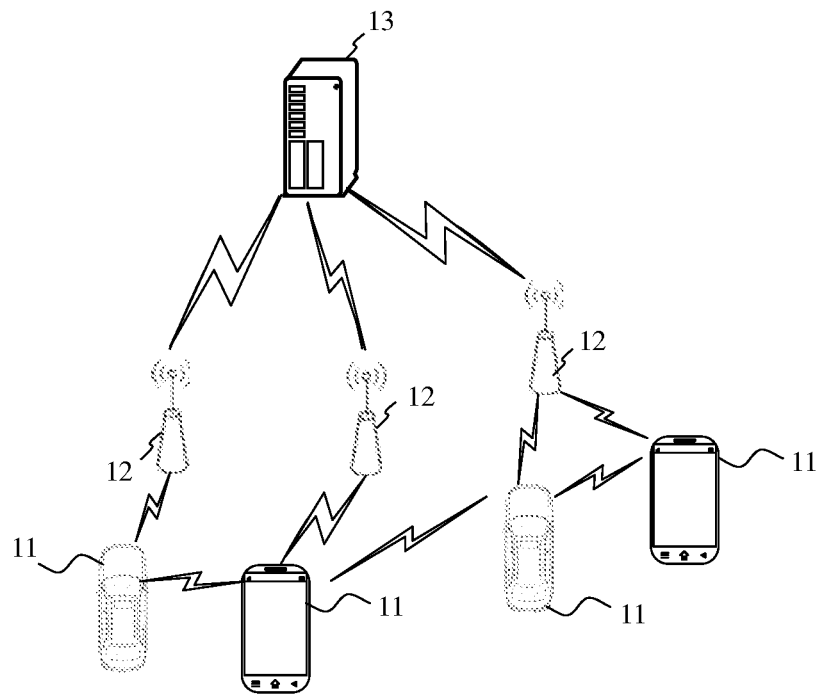
FIG. 1 is a schematic structural diagram of a radio communication system according to an example.

With reference to FIG. 1, a structural schematic diagram of a radio communication system provided in an example of the disclosure is shown. As shown in FIG. 1, the radio communication system is based on a cellular mobile communication technology, and may include: several UEs 11 and several base stations 12.

The UEs 11 may be devices providing speech and/or data connectivity for a user. The UEs 11 may be in communication with one or more core networks via a radio access network (RAN). Each of the UEs 11 may be an Internet of Things UE, such as a sensor device, a mobile telephone (also called a cellular telephone) or a computer having an Internet of Things UE, for instance, may be a stationary, portable, pocket, handheld, intra-computer or vehicle-mounted apparatus, for instance, a station (STA), a subscriber unit, a subscriber station, a mobile station, a mobile, a remote station, an access point, a remote terminal, an access terminal, a user terminal, a user agent, a user device, or a user equipment (UE). Alternatively, each of the UEs 11 may also be a device of an unmanned aerial vehicle. Alternatively, each of the UEs 11 may also be a vehicle-mounted device, for instance, an electronic control unit having a radio communication function, or a radio communication device externally connected to the electronic control unit. Alternatively, each of the UEs 11 may also be a roadside device, for instance, a street lamp, a signal lamp, or another roadside device having a radio communication function.

The base stations 12 may be network side devices in the radio communication system. The radio communication system may be a 4th generation (4G) mobile communication system, which is also called a long term evolution (LTE) system; and alternatively, the radio communication system may also be a 5th generation (5G) mobile communication system, which is also called a new radio (NR) system or a 5G NR system. Alternatively, the radio communication system may also be a next-generation system of the 5G system. An access network in the 5G system may be called a new generation-radio access network (NG-RAN). Alternatively, the radio communication system may also be a machine type communication (MTC) system.

Each of the base stations 12 may be an evolved node B (eNB) used in the 4G system. Alternatively, each of the base stations 12 may also be a generation node B (gNB) with a central and distributed framework used in the 5G system. When using the central and distributed framework, each of the base stations 12 usually includes a central unit (CU) and at least two distributed units (DUs). The central unit is provided with protocol stacks of a packet data convergence protocol (PDCP) layer, a radio link control (RLC) layer, and a media access control (MAC) layer; and the distributed unit is provided with a protocol stack of a physical (PHY) layer. A specific implementation of the base station 12 is not limited in the examples of the disclosure.

The base stations 12 can be in radio connection with the UEs 11 by means of radio air interface. In different implementation modes, the radio air interface is a radio air interface based on a 4th generation mobile communication network technology (4G) standard; alternatively, the radio air interface is a radio air interface based on a 5th generation mobile communication network technology (5G) standard, for instance, the radio air interface is a new radio; and alternatively, the radio air interface may also be a radio air interface based on a 5G-based next generation mobile communication network technology standard.

In some examples, an end to end (E2E) connection can be further established between the UEs 11, for instance, scenes such as vehicle to vehicle (V2V) communication, vehicle to infrastructure (V2I) communication, and vehicle to pedestrian (V2P) communication in vehicle to everything (V2X) communication.

In some examples, the radio communication system may further include a network management device 13.

The several base stations 12 are connected with the network management device 13 separately. The network management device 13 may be a core network device in the radio communication system. For instance, the network management device 13 may be a mobility management entity (MME) in an evolved packet core (EPC). Alternatively, the network management device 13 may also be other core network devices, such as a serving gateway (SGW), a public data network gateway (PGW), a policy and charging rules function (PCRF), or a home subscriber server (HSS). An implementation form of the network management device 13 is not limited in the examples of the disclosure.

Mobile applications based on an artificial intelligence (AI) service or machine learning (ML) are increasingly computationally intensive, with large memory consumption and power consumption. Meantime, a terminal device typically has strict energy consumption, computing and memory cost limitations. Thus, many AI or ML applications currently intend to offload a process of training or inference from a mobile device to a network side, such as a base station side. In this case, two dimensions may be obtained from the perspective of the resources needed by the user equipment (UE), one is the dimension of the radio resources, that is, resources of the radio interface (first type of resources) that we generally understand, for instance, a radio bandwidth that we generally understand to be needed for uplink transmission to the UE. In existing implementations, an evolved Node B (eNB) allocates this type of resources to the UE. But with introduction of a new service for the mobile applications of AI/ML, besides the first dimension resources that need to be considered, the second dimension that needs more consideration is the computation dimension (second type of resources), that is, computation resources consumed by the base station, for instance, a central processing unit (CPU), a memory, need to be taken into account. Thus, for a certain grant provided by the base station, under the condition that only resources of first type are provided, the resources are not necessarily applicable for a logic channel corresponding to the AI service or the ML service. Thus, the logic channel corresponding to the AI service or the ML service needs to be additionally processed during logic channel priority processing.

Figure 2:
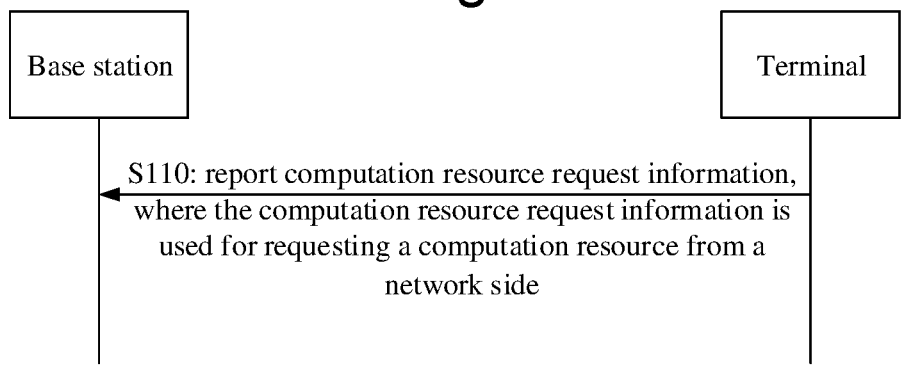
FIG. 2 is a schematic flow diagram of a method for processing resource request information according to an example.

As shown in FIG. 2, an example of the disclosure provides a method for processing resource request information. The method includes:

S110: report computation resource request information, where the computation resource request information is used for requesting a computation resource from a network side.

The method may be performed by a user equipment (UE). The UE may include, but not limited to, a stationary terminal and a mobile terminal. The mobile terminal includes, but not limited to: a communication device such as a wearable device worn by a user, or a mobile phone. The mobile terminal may further include a vehicle-mounted device, etc.

In the example of the disclosure, the computation resource request information is used for requesting the computation resource from the network side, so as to provide the computation resource for service processing at the terminal. Thus, when the network side issues an uplink grant according to a configuration resource, not only a radio air interface resource is taken into account, but also the computation resource is taken into account. As such, a service providing failure phenomenon that a scheduled resource fails to provide a corresponding service since the computation resource is not considered when the network side performs resource scheduling may be reduced, and the service quality of the service may be improved.

In the example of the disclosure, the computation resource request information may be used for indicating at least one of:

quantity information used for indicating the quantity of the requested computation resource, which may also be referred to as computation size; or
  type information used for indicating a requested computation resource type. In an example, the types of the computation resource may include computing resource types and storage resource types. The computation resource types associated with computing may include a computing resource, such as a CPU or a graphics processing unit (GPU). The storage resource types may also include a memory resource or a hard disk resource for data storage during computing.

By transmitting the computation resource request information, in resource configuration for the network side, besides a buffer status report (BSR), information about the computation resource may further be provided, so as to provide more reference information for targeted resource configuration and scheduling, such that a scheduled resource is more compliant with current communication needs. On the one hand, unnecessary resource waste is reduced, and on the other hand, the resource required by the UE is provided as much as possible, to guarantee the transmission of the service.

In some examples, the step of reporting computation resource request information includes:

report the computation resource request information by means of a medium access control (MAC) control element (CE).

The resource request information is reported by means of the MAC CE, in this way, the network side takes into account various types of resources needed when multiplexing from a logic channel to a transport channel corresponding to the MAC CE when issuing an uplink grant. Uploading the computation resource request information by means of the MAC CE has features of easy implementation and great flexibility.

In some examples, the computation resource request information is carried in a computation status request (CSR) and reported; and alternatively, the computation resource request information is carried in a buffer status report (BSR) and reported.

The computation resource request information may be carried in a configured CSR and reported. The CSR may be a request provided for uploading the computation resource request information, in this way, an information format of the CSR may be adaptively adjusted based on the features of the computation resource request information. For instance, fields included in the CSR and the quantity of bits included in each field, etc. are determined based on the features of the computation resource request information.

In an example, the CSR is associated with a logic channel identity (LCID) value, and the CSR corresponds to one of reserved indexes in LCID indexes of the LCID value. The CSR may be assigned an independent LCID value. For instance, index 33 in Table 1 is one of reserved indexes of LCID values currently used for an uplink shared channel (UL-SCH). Index 33 may be assigned to the CSR. Certainly, in another example, the index of the CSR may also be a completely independent additional index.

Table 1 shows corresponding relations between the CSR carrying the computation resource request information and the indexes.

TABLE 1

| Index | Logic channel identity (LCID) values |
|---|---|
| 0 | 64-bit common control channel (CCCH) |
| 1-32 | Logic channel identity (LCID) |
| 33 | Computation status request (CSR) |
| 34-51 | Reserved |
| 52 | 48-bit CCCH |
| 53 | Recommended bit rate query |
| 54 | Multiple entry power headroom report (PHR) (four octet Ci) |
| 55 | Configured grant confirmation |
| 56 | Multiple entry PHR (one octet Ci) |
| 57 | Single entry PHR |
| 58 | Cell radio temporary identity (C-RNTI) |
| 59 | Short truncated buffer status report (BSR) |
| 60 | Long truncated BSR |
| 61 | Short BSR |
| 62 | Long BSR |
| 63 | Padding |

The CSR in Table 1 may be used for carrying computation resource request information.

In some other examples, to simplify transmission and for better compatibility with the related art, in the example of the disclosure, the computation resource request information and the buffer information may multiplex the BSR, and in this way, the BSR may be used for carrying both the computation resource request information and the buffer information.

The buffer information may be used for indicating a data size of a buffer data packet to be transmitted by the UE, and/or resource information needed to transmit the buffer data packet, etc.

In an example, one or more fields are added to the BSR so as to carry the computation resource request information.

In another example, the computation resource request information is carried by using reserved bits or reserved sequences in the BSR.

In an example, the computation resource request information is used for indicating a requested computation size and/or computation resource type, the computation size indicating the amount of the requested computation resource, and the computation resource type includes a computing resource type and/or a storage resource type.

In some examples, the BSR includes at least one of:
  the computation size; or
  a buffer size indicating a buffer data size currently buffered for transmission by the UE; and in this way, the network side may schedule an adaptive uplink transmission resource for transmission of the buffer data according to the buffer size.

In an embodiment, the computation size may be used for indicating a range of the required computation resource and includes: a size of a computing resource (a computing size) needed for service processing and/or a size of a storage resource (a storage resource size) needed, so as to facilitate resource scheduling by the network side according to the computing size and/or the size of the storage resources needed.

Thus, in an example, the BSR includes:
a computing size used for indicating the amount of a requested computing resource; and
a buffer size indicating a buffer data size currently buffered for transmission by the UE; and in this way, the network side may schedule an adaptive uplink transmission resource for transmission of the buffer data according to the buffer size.

The computing size may separately indicate the amount of resources of a processor such as a CPU and/or a GPU that is needed for service processing by the terminal, for instance, a preset number of threads, and/or CPU cores, etc.

Alternatively, the computing size may indicate a range of number of computing times needed for service processing by the terminal, for instance, 100 thousand multiply-accumulates, etc.

In another example, the BSR includes:
a storage resource size used for indicating the amount of a storage resource needed for service processing; and
a buffer size indicating a buffer data size currently buffered for transmission by the UE; and in this way, the network side may schedule an adaptive uplink transmission resource for transmission of the buffer data according to the buffer size.

In yet another example, the BSR includes:
a computing size used for indicating the amount of a requested computing resource;
a storage resource size used for indicating the amount of a storage resource needed for service processing; and
a buffer size indicating a buffer data size currently buffered for transmission by the UE; and in this way, the network side may schedule an adaptive uplink transmission resource for transmission of the buffer data according to the buffer size.

For instance, an access device and/or a core network device on the network side performs resource scheduling.

The access device on the network side includes, but not limited to, a base station.

The core network device includes, but not limited to, an access management function (AMF), etc. for scheduling of a radio air interface resource and/or a computation resource on the network side.

In an example, the BSR includes a first field used for the computation size and a second field used for the buffer size; and alternatively, the BSR includes a single field available for both the computation size and the buffer size.

The number of bits corresponding to the single field may be arbitrary number, and the single field may correspond to one or more bytes.

In some examples, the BSR includes: different types of bytes carrying the computation size and the buffer size separately; and
alternatively, the BSR includes a byte capable of carrying both the computation size and the buffer size.

In an example, by adapting the BSR (for instance, adding one or more fields used for indicating the computation size in the BSR), the computation size and the buffer size may be carried in different types of fields in the BSR, and in this way, the BSR will have two different types of fields that carry fixed contents, either the computation size or the buffer size.

In another example, the BSR may further include a single field that may carry either the computation size or the buffer size, or may indicate both the computation size and the buffer size.

Figure 3:
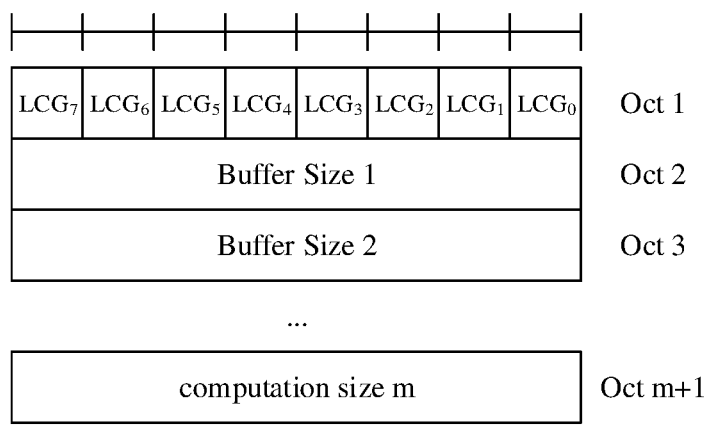
FIG. 3 is a schematic diagram of a buffer status report (BSR) according to an example.

FIG. 3 is a schematic diagram of the BSR carrying both the buffer size and the computation size. In this figure, the field is an octet. Oct1 carries an identity of the logic channel, and may carry 8 bits of identity of the logic channel. Oct2 and Oct3 carry the buffer size, Octm+1 is the computation size, and in this case, the computation size and buffer size are carried by different bytes.

With reference to FIG. 4, the computation size occupies only part of the bits in one byte, and the remaining bits of the byte may further be used for indicating the buffer size. For instance, in FIG. 4, the computation size occupies the last two bits of Oct1 and the first 5 bits of Oct2. The remaining bits of Oct2 may be used for indicating the buffer size or may be reserved for use as the remaining bits, denoted by R.

In some examples, the computation resource request information indicates the amount of a requested computation resource and/or a computation resource type by carrying a computation size and/or the computation resource type.

The amount of the computation resource may be indicated by the amount of the requested computation, for instance, N multiply-accumulates. The N multiply-accumulates include: N additions and N multiplies.

The computation resource type may include a computing resource formed by resources such as a CPU and/or a GPU, and/or a storage resource such as a memory.

In some examples, the computation resource request information includes:
a first resource index used for indicating a quantization range of the computing resource;
and/or,
a second resource index used for indicating a quantization range of the storage resource.

For instance, different quantization ranges of the computing resource have different resource indexes. In this way, a first resource index may have M1 bits, $2^{M1}$ values of the M1 bits may indicate $2^{M1}$ ranges. M1 is 0 or a positive integer. Table 2 shows a corresponding relation when the first resource index is the quantization range of the computing resource.

TABLE 2

| First resource index | Number of operations (ten thousand times) |
|---|---|
| 0 | 0-1 |
| 1 | 1-10 |
| 2 | . . . |
| . . . | . . . |
| 63 | . . . |

Similarly, different quantization ranges of the storage resource have different resource indexes. In this way, a second resource index may have M2 bits, $2^{M2}$ values of the M2 bits may indicate $2^{M2}$ ranges. M2 is 0 or a positive integer. Table 3 shows a corresponding relation when the second resource index is the quantization range of the storage resource.

TABLE 3

| Second resource index | Memory consumption (hundred Mega) |
|---|---|
| 0 | 0-1 |
| 1 | 1-10 |
| 2 | ... |
| ... | ... |
| 63 | ... |

In some examples, the computation resource request information includes:
  a third resource index used for indicating the quantity of a computing resource and the quantity of a storage resource corresponding to the quantity of the computing resource. For instance, table 4 shows an index table of the third resource index indicating both the quantity of the computing resource and the quantity of the storage resource corresponding to the quantity of the computing resource.

Table 4 is an illustration of a corresponding relation between the third resource index and the quantity of the computing resource as well as the quantity of the storage resource.

TABLE 4

| Third resource index | Multiply-accumulates | Memory consumption |
|---|---|---|
| 0 | 0-1 | 0-1 |
| 1 | 1-10 | 1-10 |
| 2 | ... | ... |
| ... | ... | ... |
| 63 | ... | ... |

In an example of the disclosure, by the introduction of the third resource index, since the third resource establishes a corresponding relation with both the quantity of the computing resource and the quantity of the storage resource, the reporting by the third resource index simultaneously reports the quantity of the computing resource requested by the UE and the quantity of the storage resource, which has a small signaling overhead.

In another example, the computation resource request information includes:
  a fourth resource index used for indicating the computation size and/or the buffer size.

For instance, when the fourth resource index indicates the computation size and/or the buffer size, then the computation size has a preset corresponding relation with the buffer size. In this way, one resource index indicating both the computation size and the buffer size may be implemented.

In an example, the fourth resource index is used for indicating a computation resource and a buffer size corresponding to the computation resource. In this case, the fourth resource index indicates both a computation size and the buffer size. In this way, the indication of both the buffer size and the computation size is implemented by a single resource index, and a bit overhead is small.

In an example, the fourth resource index may be carried by a single field. The single field here may include one or more bytes. That is, the single field carries a fourth resource index used for indicating the computation size and/or the buffer size.

In an example, the BSR has a plurality of types of fields, for instance, a single field that indicates a buffer size, a single field that indicates a computation size, and/or a single field that may indicate both the buffer size and the computation size.

The single field here may include one or more bytes.

Table 5 is an illustration of corresponding relations between the fourth resource index and the computation size as well as the buffer size.

TABLE 5

| Index | Buffer size (BS) value | Multiply-Accumulates (10 thousand times) |
|---|---|---|
| 0 | 0 | 0-1 |
| 1 | ≤10 | 10-20 |
| 2 | ≤14 | ... |
| 3 | ≤20 | ... |
| 4 | ≤28 | ... |
| 5 | ≤38 | ... |
| 6 | ≤53 | ... |
| 7 | ≤74 | ... |
| 8 | ≤102 | ... |
| 9 | ≤142 | ... |
| 10 | ≤198 | ... |
| 11 | ≤276 | ... |
| 12 | ≤384 | ... |
| 13 | ≤535 | ... |
| 14 | ≤745 | ... |
| 15 | ≤1038 | ... |
| 16 | ≤1446 | ... |
| 17 | ≤2014 | ... |
| 18 | ≤2806 | ... |
| 19 | ≤3909 | ... |
| 20 | ≤5446 | ... |
| 21 | ≤7587 | ... |
| 22 | ≤10570 | ... |
| 23 | ≤14726 | ... |
| 24 | ≤20516 | ... |
| 25 | ≤28581 | ... |
| 26 | ≤39818 | ... |
| 27 | ≤55474 | ... |
| 28 | ≤77284 | ... |
| 29 | ≤107669 | ... |
| 30 | ≤150000 | ... |
| 31 | ≤150000 | ... |

In the example of the disclosure, the first resource index to the fourth resource index may be carried in the CSR or the BSR separately. However, the first resource index to the third resource index are preferentially carried when the computation resource request information is transmitted by means of the CSR. The fourth resource index is preferentially carried when the computation resource request information is transmitted by means of the BSR, so as to implement simultaneous indication and request of the BS and CS.

In some examples, the step of reporting computation resource request information includes:
  receive the reported computation resource request information according to preset computation resource reporting granularity.

This preset computation resource reporting granularity includes one of:
  UE granularity;
  logic channel granularity; or
  logic channel group granularity.

For instance, when the computation resource request information is reported at the granularity of the entire UE, the corresponding computation resource request information may be reported after computation resources needed for all logic channels in the UE being counted.

The computation resource request information is reported for computing resource allocations for each logic channel under the condition that the computation resource request information is reported at the granularity of the logic channel.

A logic channel group may include one or more logic channels.

When the computation resource request information is reported at the granularity of the logic channel group, the corresponding computation resource request information may be reported after computation resources needed for the entire logic channel group being counted.

The reporting of the computation resource request information at different resource granularity may be based on a current demand, to satisfy different communication scenes and demands under communication scenes, according to preset granularity.

In some examples, S110 may include:
report the computation resource request information in response to a request to transmit a first type of service.

The method further includes:
report no computation resource request information in response to a request to transmit a second type of service.

The amount of the computation resource needed for the first type of service is greater than the computation resource needed for the second type of service.

The first type of service may include a service associated with artificial intelligence (AI) and/or a service associated with machine learning (ML).

The second type of service may be services other than the service associated with AI or the service associated with ML, for instance, a regular speech service or video service.

Typically, the type of resources needed for the second type of service is mainly air interface resources. The type of resources needed for the first type of service may be primarily computation resources.

The service associated with AI includes, but not limited to, at least one of:
an AI application service, such as a service using an AI model, for instance, image recognition and/or speech processing based on the AI model, etc.; or
an AI training service for training the AI model.

The service associated with ML includes, but not limited to, at least one of:
an ML application service, such as a service using an ML model, for instance, image recognition and/or speech processing based on the ML model, etc.; or
an ML generation service for generating the ML model based on inference operations such as induction and refinement of sample data.

For instance, in view of the fact that only the logic channels for the first type of service have a need to report the computation resource index, the logic channels of the first type of service may be attributed into one logic channel group, and computation resource request information for such logic channel group are reported overall by using the MAC CE. The logic channels of the second type of service that do not need to report the computation resource request information are attributed to a different logic channel group from the logic channels of the first type of service, such logic channel group may report the buffer size with a BSR that does not need to report the computation resource request information.

As shown in FIG. 5, an example of the disclosure provides a method for processing resource request information. The method includes:

S210: receive computation resource request information, where the computation resource request information is used for requesting a computation resource from a network side.

The method for processing resource request information according to the example of the disclosure may be performed by a network side, in particular in an access device and/or a core network device on the network side.

In the example of the disclosure, the network side device may receive the computation resource request information transmitted by the UE, and after receiving the computation resource request information, the network side device may perform resource scheduling according to the computation resource request information, or disregard the computation resource request information for performing resource scheduling.

In some examples, S210 may include:
receive the computation resource request information by means of an MAC CE.

The computation resource request information is carried at an MAC CE layer. Since the computation resource request information is carried by the MAC CE, the network side may obtain the computation resource request information by receiving the MAC CE.

In some examples, the computation resource request information is carried in a computation status request (CSR); and alternatively, the computation resource request information is carried in a buffer status report (BSR).

In an example, the computation resource request information is used for indicating a requested computation size and/or computation resource type, the computation size indicating the amount of the requested computation resource, and the computation resource type includes a computing resource type and/or a storage resource type.

In another example, the CSR is associated with a logic channel identity (LCID) value, and the CSR corresponds to one of reserved indexes in LCID indexes of the LCID value.

Index 33 in Table 1 is the index of the CSR, and is a reserved index in the indexes corresponding to the LCID value.

In another example, the index of the CSR may further be an additional index in the indexes corresponding to the LCID value.

In an example, the BSR includes at least one of:
the computation size; or
a buffer size, the buffer size is used for indicating a requested buffer data size.

The computation size may include a computing size and/or a storage size. The storage size may be short for a storage resource size.

Thus, in an example, the BSR includes:
a computing size used for indicating the amount of a requested computing resource; and
a buffer size indicating a buffer data size currently buffered for transmission by the UE; and in this way, the network side may schedule an adaptive uplink transmission resource for transmission of the buffer data according to the buffer size.

The computing size may separately indicate the amount of resources of a processor such as a CPU and/or a GPU that is needed for service processing by the terminal, for instance, a preset number of threads, and/or CPU cores, etc.

Alternatively, the computing size may indicate a range of number of computing times needed for service processing by the terminal, for instance, 100 thousand multiply-accumulates, etc.

In another example, the BSR includes:
a storage resource size used for indicating the amount of a storage resource needed for service processing; and
a buffer size indicating a buffer data size currently buffered for transmission by the UE; and in this way, the network side may schedule an adaptive uplink transmission resource for transmission of the buffer data according to the buffer size.

In yet another example, the BSR includes:
a computing size used for indicating the amount of a requested computing resource;
a storage resource size used for indicating the amount of a storage resource needed for service processing; and
a buffer size indicating a buffer data size currently buffered for transmission by the UE; and in this way, the network side may schedule an adaptive uplink transmission resource for transmission of the buffer data according to the buffer size.

Reference may be made to the foregoing examples for related descriptions of the buffer size and the computing size, which is not repeated here.

In an example, the BSR includes a first field used for the computation size and a second field used for the buffer size; and alternatively, the BSR includes a single field available for both the computation size and the buffer size.

The number of bits corresponding to the single field may be arbitrary number, and the single field may correspond to one or more bytes.

In some examples, the BSR includes: different types of fields carrying the computation size and the buffer size separately; and alternatively, the BSR includes a field capable of carrying both the computation size and the buffer size.

The one field here may include one or more bytes.

In some examples, the computation resource request information indicates the amount of a requested computation resource and/or a computation resource type by carrying a computation size and/or the computation resource type.

The computation resource may include a computing resource and a storage resource. The computing resource involves a CPU, or GPU, etc. The storage resource relates to at least a memory.

In some example, the computing resource size includes:
a first resource index used for indicating a quantization range of the computing resource;
and/or,
a second resource index used for indicating a quantization range of the storage resource.

In some examples, the computation resource request information further includes:
a third resource index used for indicating the quantity of a computing resource and the quantity of a storage resource corresponding to the quantity of the computing resource.

In another example, the computation resource request information further includes:
a fourth resource index used for indicating the computation size and/or the buffer size.

A single field carries the fourth resource index used for indicating the computation size and/or the buffer size.

In some examples, S210 may include:
receive the reported computation resource request information according to preset computation resource reporting granularity.

The UE may report the computation resource request information according to the currently needed computation resource reporting granularity. In this way, the base station receives the computation resource request information reported by the UE according to the preset computation resource reporting granularity.

This preset computation resource reporting granularity includes, but not limited to, one of: UE granularity; logic channel granularity; or logic channel group granularity.

The network side needs to perform resource scheduling according to the computation resource request information, for instance, under the condition that the UE reports the computation resource request information at the UE granularity, the computation resources are uniformly scheduled for all logic channels of the UE at the UE granularity. Under the condition that the UE reports the computation resource request information per logic channel group (LCG), computation resource scheduling per LCG is performed on the logic channels in the UE at the granularity of the logic channel group. Under the condition that the UE reports the computation resource request information per single logic channel (LC), computation resource scheduling per single LC is performed on the logic channels in the UE at the granularity of the logic channel.

In some examples, with reference to FIG. 6, the method further includes:
S220: issue an uplink grant according to the computation resource request information, where the uplink grant is used for uplink resource scheduling.

The uplink grant here may be used for physical uplink shared channel (PUSCH) scheduling, during PUSCH scheduling, the consideration of the computation resource may be introduced while the computation resource request information is combined for air interface resource scheduling, such that the scheduled resources may better complete the corresponding service.

Figure 7:
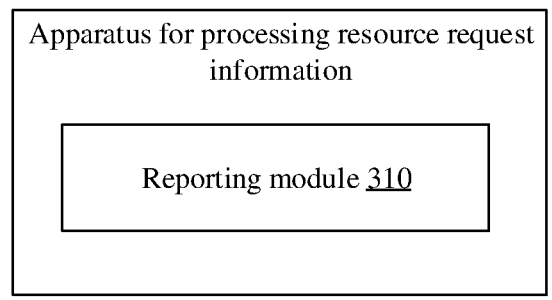
FIG. 7 is a schematic structural diagram of an apparatus for processing resource request information according to an example.

As shown in FIG. 7, an example of the disclosure provides an apparatus for processing resource request information. The apparatus includes:
a reporting module 310 configured to report computation resource request information, where the computation resource request information is used for requesting a computation resource from a network side.

In some examples, the reporting module 310 includes, but not limited to, a program module. After being executed by a processor, the program module may implement reporting the computation resource request information.

In some other examples, the reporting module 310 includes, but not limited to, a software-and-hardware-combined module; and the software-and-hardware-combined module is not limited to a programmable array. The programmable array includes, but not limited to, various complex programmable arrays or field programmable arrays.

In still other examples, the reporting module 310 further includes, but not limited to, a pure hardware module; and the pure hardware module includes, but not limited to, a pure hardware circuit.

In some examples, the reporting module 310 is configured to report the computation resource request information by means of a medium access control (MAC) control element (CE).

In some examples, the computation resource request information is carried in a computation status request (CSR); and alternatively, the computation resource request information is carried in a buffer status report (BSR).

In some examples, the computation resource request information is used for indicating a requested computation size and/or computation resource type, the computation size indicating the amount of the requested computation resource, and the computation resource type includes a computing resource type and/or a storage resource type.

In some examples, the CSR is associated with an LCID value, and the CSR corresponds to one of reserved indexes in LCID indexes of the LCID value.

In some examples, the BSR includes at least one of:
the computation size; or
a buffer size, the buffer size is used for indicating a requested buffer data size.

In some examples, the BSR includes a first field used for the computation size and a second field used for the buffer size;
and alternatively,
the BSR includes a single field available for both the computation size and the buffer size.

In some examples, the computation resource request information includes:
a first resource index used for indicating a quantization range of the requested computation resource;
and/or,
a second resource index used for indicating a quantization range of a requested storage resource.

In some examples, the computation resource request information includes:
a third resource index used for indicating the quantity of a computing resource and the quantity of a storage resource corresponding to the quantity of the computing resource.

In some example, the single field carries
a fourth resource index used for indicating the computation size and/or the buffer size.

In some examples, the computation size has a preset corresponding relation with the buffer size.

In some examples, the step of reporting computation resource request information includes:
receive the reported computation resource request information according to preset computation resource reporting granularity.

In some examples, the preset computation resource reporting granularity includes one of: UE granularity; logic channel granularity; or logic channel group granularity.

Figure 8:
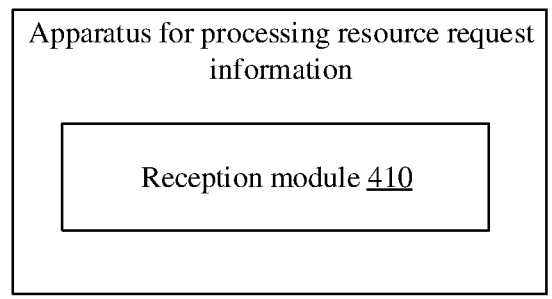
FIG. 8 is a schematic structural diagram of an apparatus for processing resource request information according to an example.

As shown in FIG. 8, an example of the disclosure provides an apparatus for processing resource request information. The apparatus includes:
a reception module 410 configured to receive computation resource request information, where the computation resource request information is used for requesting a computation resource from a network side.

In some examples, the reception module 410 includes, but not limited to, a program module. After being executed by a processor, the program module may implement receiving the computation resource request information.

In some other examples, the reception module 410 includes, but not limited to, a software-and-hardware-combined module; and the software-and-hardware-combined module is not limited to a programmable array. The programmable array includes, but not limited to, various complex programmable arrays or field programmable arrays.

In still other examples, the reception module 410 further includes, but not limited to, a pure hardware module; and the pure hardware module includes, but not limited to, a pure hardware circuit.

In some examples, the reception module 410 is configured to receive the computation resource request information by means of an MAC CE.

In some examples, the computation resource request information is carried in a computation status request (CSR); and alternatively, the computation resource request information is carried in a buffer status report (BSR).

In some examples, the computation resource request information is used for indicating a requested computation size and/or computation resource type, the computation size indicating the amount of the requested computation resource, and the computation resource type includes a computing resource type and/or a storage resource type.

In some examples, the CSR is associated with an LCID value, and the CSR corresponds to one of reserved indexes in LCID indexes of the LCID value.

In some examples, the BSR includes at least one of: the computation size; or a buffer size, the buffer size is used for indicating a requested buffer data size.

In some examples, the BSR includes a first field for the computation size and a second field for the buffer size; and alternatively, the BSR includes a single field for both the computation size and the buffer size.

In some examples, the computation resource request information includes: a first resource index used for indicating a quantization range of the requested computation resource; and/or, a second resource index used for indicating a quantization range of a requested storage resource.

In some examples, the computation resource request information includes:
a third resource index used for indicating the quantity of a computing resource and the quantity of a storage resource corresponding to the quantity of the computing resource.

In some example, the single field carries
a fourth resource index used for indicating the computation size and/or the buffer size.

In some examples, the computation size has a preset corresponding relation with the buffer size.

In some examples, the receiving computation resource request information includes:
receive the computation resource request information reported according to preset computation resource reporting granularity.

In some examples, the preset computation resource reporting granularity includes one of:
UE granularity;
logic channel granularity; or
logic channel group granularity.

An example provides a computation resource request method. The method includes:
introduce a new MAC CE for a UE to provide computation resource request information for a base station.

As an example, the MAC CE is called as a computation status request (CSR), and in this case, a new LCID value needs to be added to a protocol to represent the CSR.

The added LCID value is mainly used for scheduling an uplink shared channel (UL-SCH).

As an example, the CSR carries the amount of the computation resource needed by the UE, for instance, N multiply-accumulates; and/or the CSR carries memory consumption (in bytes or bits, etc.) needed by the UE.

In order to reduce signaling overhead, the UE merely reports a corresponding code point.

A corresponding relation between the code point and the corresponding computation resource may be specified by the protocol or pre-agreed (hardcoded in a terminal). The code point here may be any one of the foregoing first resource index to fourth resource index.

As an example: 0-10 thousand multiply-accumulates is reported as 0, 10-100 thousand multiply-accumulates is reported as 1 . . .

As an example: 0-10 thousand multiply-accumulates is reported as 1, 10-100 thousand multiply-accumulates is reported as 0 . . .

The following is an example of a combination of reporting the multiply-accumulates and memory consumption. A mapping relation of a computation size levels index to specific computation resources is established in Table 1. Here, the computation size levels index may be the foregoing first resource index for indicating a needed computation size or computation size level.

The granularity of a computation resource needed for reporting a logic channel may be per UE or per logic channel (LCH) or per logic channel group (LCG).

In the example of reporting per LC, the LCID occupies 6 bits, the number of bits occupied by a computing size may be 7 bits, and the other are reserved bits.

The existing MAC CE carrying a BSR is extended, which is used for the UE to provide information requesting a computation resource to the base station. As an example: logic channels for an AI service or an ML service are individually in one logic channel group.

As an example, the UE providing the base station with the information requesting computation resource from a network side may be jointly and uniformly coded with the existing BSR, for instance, jointly and uniformly coded may be embodied in the mode of the foregoing fourth resource index.

In this case, for some LCGs, a field in a BSR message reported is not just the original buffer size level and may further include a computation size.

The example of the disclosure provides a communication device. The communication device includes a processor, a transceiver, a memory, and an executable program which is stored on the memory and runnable by the processor, where when running the executable program, the processor executes a method for processing resource request information performed by a UE and provided by any of the aforementioned technical solutions, or executes a method for processing resource request information performed by a base station and provided by any of the aforementioned technical solutions.

The communication device may be the aforementioned base station or UE.

The processor may include various types of storage media. The storage media are non-transitory computer storage media that may continue to remember information stored after the communication device is powered off. The communication device includes the base station or the UE.

The processor may be connected to the memory through a bus, etc. for reading the executable program stored on the memory, for instance, at least one of the methods shown in FIGS. 2-5.

The example of the disclosure provides a computer storage medium. The computer storage medium stores an executable program, and after the executable program is executed by a processor, the method shown in any technical solution of the first aspect or the second aspect may be implemented, for instance, at least one of the methods as shown in FIGS. 2, 5, and 6.

Figure 9:
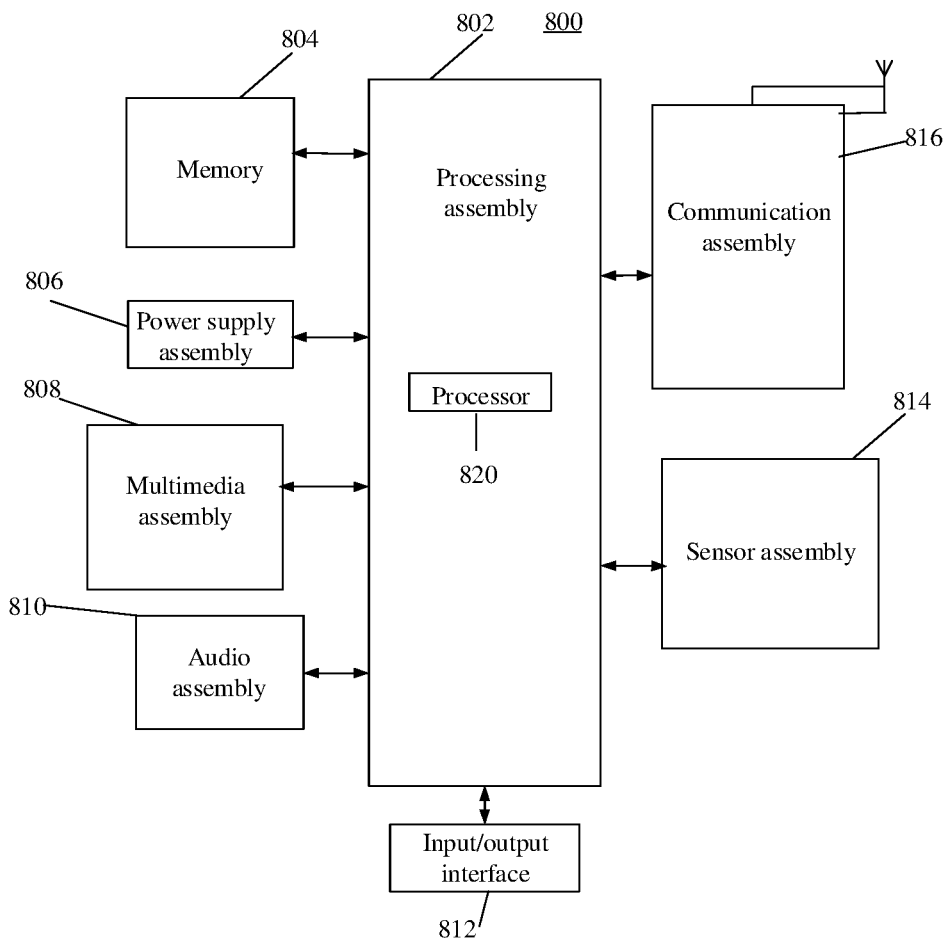
FIG. 9 is a schematic structural diagram of a user equipment (UE) according to an example.

FIG. 9 is a block diagram of a UE 800 shown according to an example. For instance, the UE 800 may be a mobile phone, a computer, a digital broadcast user equipment, a messaging device, a gaming console, a tablet device, a medical device, a fitness device, a personal digital assistant, etc.

With reference to FIG. 9, the UE 800 may include one or more of the following assemblies: a processing assembly 802, a memory 804, a power supply assembly 806, a multimedia assembly 808, an audio assembly 810, an input/output (I/O) interface 812, a sensor assembly 814, and a communication assembly 816.

Generally, the processing assembly 802 controls an overall operation of the UE 800, such as operations associated with display, telephone calls, data communication, a camera operation, and a recording operation. The processing assembly 802 may include one or more processors 820, to execute instructions, so as to complete all or some of steps of the methods described above. In addition, the processing assembly 802 may include one or more modules that facilitate interaction between the processing assembly 802 and other assemblies. For instance, the processing assembly 802 may include a multimedia module, to facilitate interaction between the multimedia assembly 808 and the processing assembly 802.

The memory 804 is configured to store various types of data to support the operations at the UE 800. Instances of these data include instructions of any application or method operated on the UE 800, contact data, phonebook data, messages, pictures, videos, etc. The memory 804 may be implemented through any type or combination of volatile or non-volatile memory devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply assembly 806 supply power to various assemblies of the UE 800. The power supply assembly 806 may include a power supply management system, one or more power supplies, and other assemblies associated with power generating, managing, and distributing for the UE 800.

The multimedia assembly 808 includes a screen that provides an output interface between the UE 800 and a user. In some examples, the screen may include a liquid crystal display (LCD) and a touch panel (TP). In the case that the screen includes a touch panel, the screen may be implemented as a touch screen, so as to receive an input signal from a user. The touch panel includes one or more touch sensors, so as to sense touches, swipes, and gestures on the touch panel. The touch sensor may sense a boundary of a touch or swipe, and may also measure time of duration and pressure associated with the touch or swipe. In some examples, the multimedia assembly 808 includes a front camera and/or a back camera. When the UE 800 is in an operational mode, for instance, a photographing mode or a video mode, the front-facing camera and/or the rear-facing camera may receive external multimedia data. Each of the front-facing camera and the rear-facing camera may be a fixed optical lens system or have a focal length and an optical zoom capacity.

The audio assembly 810 is configured to output and/or input audio signals. For instance, the audio assembly 810 includes a microphone (MIC) configured to receive an external audio signal when the UE 800 is in operational modes, such as a call mode, a recording mode, and a speech recognition mode. The received audio signal may be further stored in the memory 804 or transmitted via the communication assembly 816. In some examples, the audio assembly 810 further includes a speaker for outputting an audio signal.

The I/O interface 812 provides an interface between the processing assembly 802 and a peripheral interface module, such as a keyboard, a click wheel, a button, etc. These button may include, but are not limited to, a home button, a volume button, a start button, and a lock button.

The sensor assembly 814 includes one or more sensors for providing state assessments of various aspects of the UE 800. For example, the sensor assembly 814 may detect an on/off state of the device 800 and relative positioning of the assemblies. For instance, the assemblies are a display and a keypad of the UE 800. The sensor assembly 814 may also detect a change in position of the UE 800 or an assembly of the UE 800, the presence or absence of contact between the user and the UE 800, orientation or acceleration/deceleration of the UE 800, and temperature variation of the UE 800. The sensor assembly 814 may include a proximity sensor configured to detect the presence of a nearby object in the absence of any physical contact. The sensor assembly 814 may further include a light sensor, such as a complementary metal oxide semiconductor (CMOS) or a charged coupled device (CCD) image sensor for imaging applications. In some examples, the sensor assembly 814 may further include an acceleration sensor, a gyroscope sensor, a magnetic sensor, a pressure sensor or a temperature sensor.

The communication assembly 816 is configured to facilitate wired or radio communication between the UE 800 and other devices. The UE 800 may access a radio network based on a communication standard, such as WiFi, 2G, or 3G, or their combination. In one example, the communication assembly 816 receives a broadcast signal or broadcast related information from an external broadcast management system by means of a broadcast channel. In one example, the communication assembly 816 further includes a near field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the UE 800 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor, or other electronic elements for executing the method above.

In an example, further provided is a non-transitory computer-readable storage medium including instructions, for instance, a memory 804 including instructions which are executable by the processor 820 of the UE 800, to complete the methods above. For instance, the non-transitory computer-readable storage medium may be a read-only memory (ROM), a random access memory (RAM), a compact disc read-only memory (CD-ROM), a magnetic tape, a floppy disk, and an optical data storage device, etc.

Figure 10:
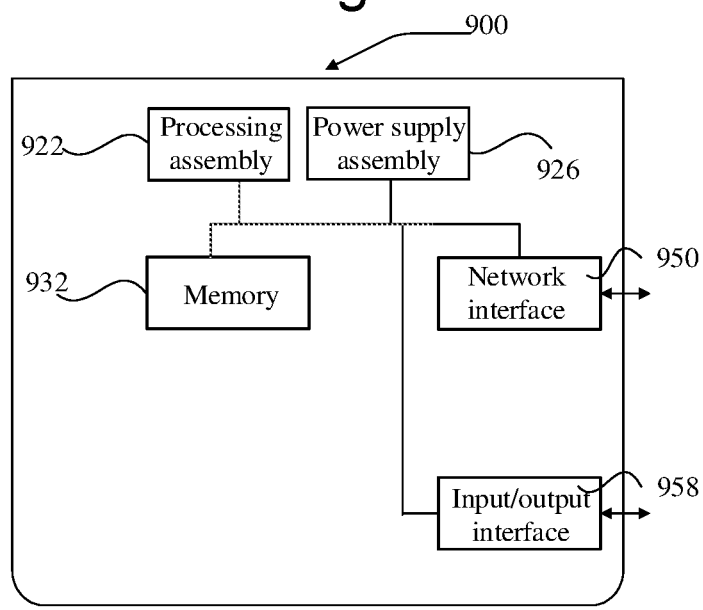
FIG. 10 is a schematic structural diagram of a base station according to an example.

As shown in FIG. 10, an example of the disclosure shows a structure of a base station. For instance, the base station 900 may be provided as a network side device. With reference to FIG. 10, the base station 900 includes a processing assembly 922, and further includes one or more processors, and memory resources represented by a memory 932 for storing an instruction executable by the processing assembly 922, for instance, an application program. The applications stored in the memory 932 may include one or more modules, each of which corresponds to a set of instructions. In addition, the processing assembly 922 is configured to execute an instruction, so as to execute any of the methods described above performed by the base station, for instance, the methods shown in FIGS. 2, 5 and 6.

The base station 900 may further include a power supply assembly 926 configured to execute power supply management of the base station 900, a wired or radio network interface 950 configured to connect the base station 900 to a network, and an input/output (I/O) interface 958. The base station 900 may operate based on an operation system stored in the memory 932, such as Windows Server™, Mac OS X™, Unix™, Linux™, FreeBSD™, etc.

Other implementation solutions to the disclosure will be easily conceived by those skilled in the art in consideration of the description and practice of the disclosure disclosed here. The disclosure is intended to cover any variations, uses, or adaptive changes of the disclosure following the general principles of the disclosure and includes common general knowledge or conventional technical means within the technical field not disclosed in the disclosure. The description and the examples are deemed illustrative, and the true scope and spirit of the disclosure are indicated by the following claims.

It is to be understood that the disclosure is not limited to precise structures which have been described above and shown in the accompanying drawings, and may have various modifications and changes without departing from the scope of the disclosure. The scope of the disclosure is limited by the appended claims only.

The invention claimed is:

1. A method for processing resource request information, performed by a user equipment (UE), comprising:
reporting computation resource request information to a network side, wherein the computation resource request information is configured for requesting a computation resource from the network side, wherein
the computation resource request information is carried in a computation status request (CSR); or
the computation resource request information is carried in a buffer status report (BSR);
wherein the CSR is associated with a logic channel identity (LCID) value, and the CSR corresponds to one of reserved indexes in LCID indexes of the LCID value.

2. The method according to claim 1, wherein reporting the computation resource request information to the network side comprises:
reporting the computation resource request information by means of a medium access control (MAC) control element (CE).

3. The method according to claim 1, wherein the computation resource request information is configured for indicating at least one of the following:
a requested computation size; or
a computation resource type,
wherein the requested computation size indicates an amount of the requested computation resource, and the computation resource type comprises at least one of a computing resource type or a storage resource type.

4. The method according to claim 3, wherein the BSR comprises at least one of:
the requested computation size; or
a buffer size,
wherein the buffer size is configured for indicating a requested buffer data size.

5. The method according to claim 4, wherein
the BSR comprises a first field configured for the requested computation size and a second field configured for the buffer size; or the BSR comprises a single field available for both the computation size and the buffer size; wherein the single field carries:
a fourth resource index configured for indicating at least one of the requested computation size or the buffer size, wherein the requested computation size has a preset corresponding relation with the buffer size.

6. The method according to claim 3, wherein the computation resource request information comprises at least one of:
a first resource index configured for indicating a quantization range of a requested computing resource;
a second resource index configured for indicating a quantization range of a requested storage resource; or
a third resource index configured for indicating a quantity of a computing resource and a quantity of a storage resource corresponding to the quantity of the computing resource.

7. The method according to claim 1, wherein reporting the computation resource request information comprises:
reporting the computation resource request information according to preset computation resource reporting granularity; wherein
the preset computation resource reporting granularity comprises one of:
UE granularity;
logic channel granularity; or
logic channel group granularity.

8. A method for processing resource request information, performed by a network side, comprising:
receiving computation resource request information from a user equipment, wherein the computation resource request information is configured for requesting a computation resource from the network side; wherein
the computation resource request information is carried in a computation status request (CSR); or
the computation resource request information is carried in a buffer status report (BSR);
wherein the CSR is associated with a logic channel identity (LCID) value, and the CSR corresponds to one of reserved indexes in LCID indexes of the LCID value.

9. The method according to claim 8, wherein receiving the computation resource request information from the user equipment comprises:
receiving the computation resource request information by means of an MAC CE.

10. The method according to claim 8, wherein the computation resource request information is configured for indicating at least one of the following:
a requested computation size; or
a computation resource type,
wherein the requested computation size indicates an amount of the requested computation resource, and the computation resource type comprises at least one of a computing resource type or a storage resource type.

11. The method according to claim 10, wherein the BSR comprises at least one of:
the requested computation size; or
a buffer size,
wherein the buffer size is configured for indicating a requested buffer data size.

12. The method according to claim 11, wherein
the BSR comprises a first field for the requested computation size and a second field for the buffer size; or
the BSR comprises a single field for both the requested computation size and the buffer size; wherein the single field carries:
a fourth resource index configured for indicating at least one of the requested computation size or the buffer size, wherein the requested computation size has a preset corresponding relation with the buffer size.

13. The method according to claim 10, wherein the computation resource request information comprises at least one of:
a first resource index configured for indicating a quantization range of a requested computing resource;
a second resource index configured for indicating a quantization range of a requested storage resource; or
a third resource index configured for indicating a quantity of a computing resource and a quantity of a storage resource corresponding to the quantity of the computing resource.

14. The method according to claim 8, wherein receiving the computation resource request information comprises:
receiving the computation resource request information reported according to preset computation resource reporting granularity; wherein
the preset computation resource reporting granularity comprises one of:
UE granularity;
logic channel granularity; or
logic channel group granularity.

15. A communication device, comprising a processor, a transceiver, a memory, and an executable program stored on the memory and executable by the processor, wherein the processor is configured to execute the method for processing resource request information according to claim 8.

16. A communication device, comprising a processor, a transceiver, a memory, and an executable program stored on the memory and executable by the processor, wherein the processor is configured to:
report computation resource request information, wherein the computation resource request information is configured for requesting a computation resource from a network side; wherein
the computation resource request information is carried in a computation status request (CSR); or
the computation resource request information is carried in a buffer status report (BSR);
wherein the CSR is associated with a logic channel identity (LCID) value, and the CSR corresponds to one of reserved indexes in LCID indexes of the LCID value.

* * * * *